United States Patent [19]

Iwanski et al.

[11] Patent Number: 5,450,519
[45] Date of Patent: Sep. 12, 1995

[54] FIBER OPTIC COUPLER ASSEMBLY

[75] Inventors: Thomas E. Iwanski, Tiverton, R.I.; James A. Doucet, Fall River, Mass.

[73] Assignee: The United States of America as represented by the Secretary of the Navy, Washington, D.C.

[21] Appl. No.: 236,823

[22] Filed: May 2, 1994

[51] Int. Cl.⁶ .............................................. G02B 6/38
[52] U.S. Cl. ................................. 385/138; 385/139; 385/76; 385/70
[58] Field of Search ............... 385/138, 139, 134, 76, 385/70, 130

[56] References Cited

U.S. PATENT DOCUMENTS

| 3,790,791 | 2/1974 | Anderson | 385/76 |
| 4,759,601 | 7/1988 | Knutsen et al. | 385/138 |
| 4,822,130 | 4/1989 | Maranto et al. | 385/138 |
| 5,263,111 | 11/1993 | Nurse et al. | 385/130 |
| 5,283,853 | 2/1994 | Szegda | 385/139 |

FOREIGN PATENT DOCUMENTS 62-66206  3/1987  Japan ................... 385/138

Primary Examiner—Rodney B. Bovernick
Assistant Examiner—Yisun Song
Attorney, Agent, or Firm—Michael L. McGowan; Prithvi C. Lall; James M. Kasischke

[57] ABSTRACT

There is presented a fiber optic coupler assembly for disposition in an underwater bulkhead, the coupler assembly comprising a hydraulic fitting portion of substantially cylindrical configuration and having first threads on an exterior portion thereof. A first shank portion extends axially from the fitting portion and has formed thereon as an integral portion thereof a collar portion configured as a nut. A second shank portion extends axially from the collar portion, and a hub portion extends axially from the second shank portion and has second threads thereon. A tubular portion extends axially from the fitting portion in a direction opposite from the first shank portion. A bore extends through the tubular portion, fitting portion, first shank portion, second shank portion, and hub portion and is configured to receive known fiber optic terminators.

9 Claims, 4 Drawing Sheets

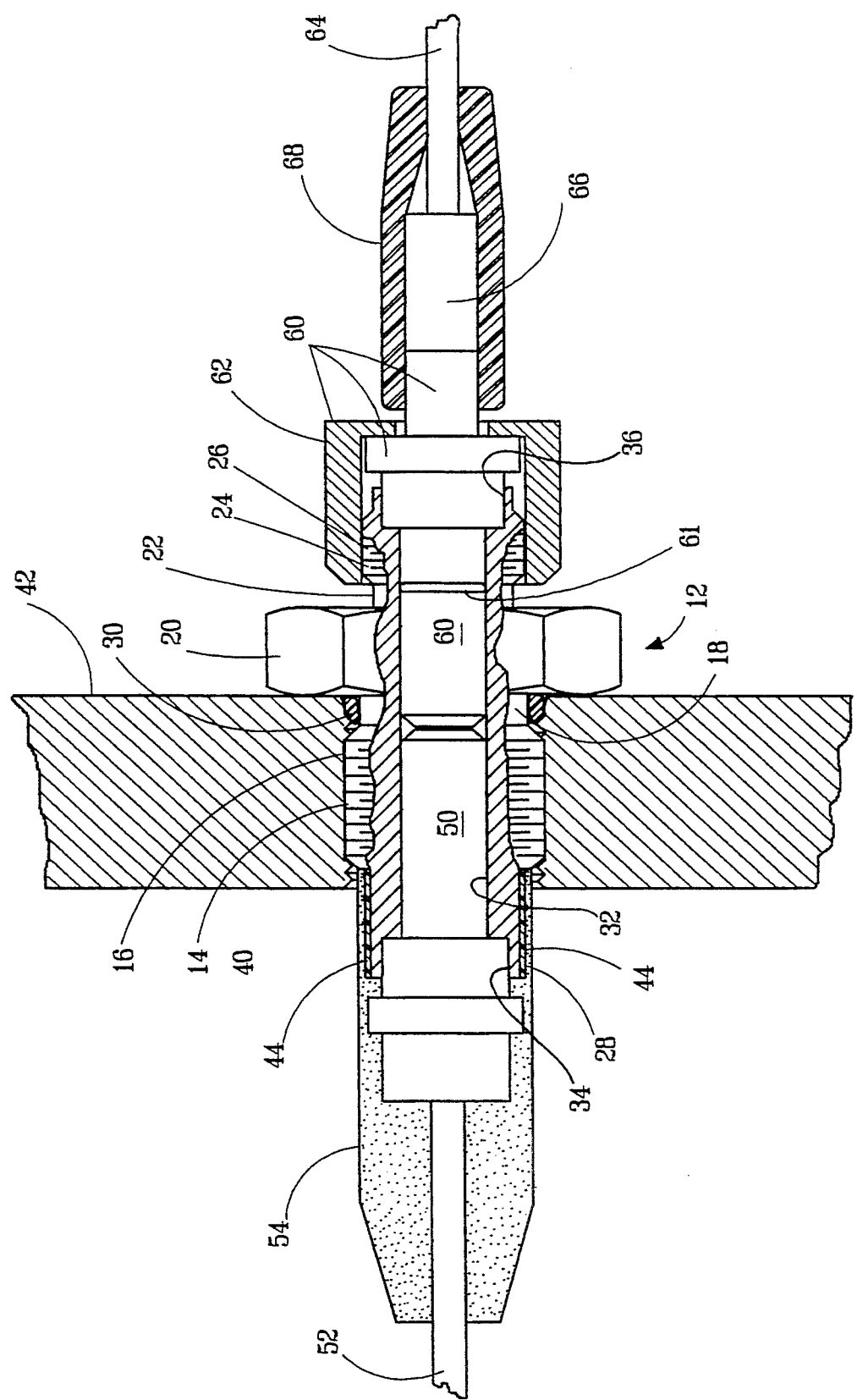

FIBER OPTIC COUPLER ASSEMBLY

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

This invention relates to fiber optic couplers and is directed more particularly to a fiber optic coupler assembly for disposition in a bulkhead underwater and subject to high pressures.

(2) Description of the Prior Art

Certain weapons systems facilitate launch of a vehicle from an underwater launch platform, as, for example, launch of a torpedo from a submarine. Before launch of the vehicle, data is fed from the launch platform to an internal vehicle controller. The transmission of such data is accomplished by way of a fiber optic link while the vehicle rests in the launch platform.

In such vehicles, there is required a fiber optic coupler for interconnecting the vehicle internal controller and the launch platform fire control system. The coupler must have some unique characteristics. Firstly, very limited surface area of the vehicle is available for coupler mounting, in some instances an area having a width of only 0.656 inch is available. Secondly, the inboard fiber optic terminator must be a standard, readily available inexpensive terminator in plentiful supply. Thirdly, the outboard (water side) fiber optic terminator must be a standard fiber optic terminator of such configuration as to facilitate quick, uncomplicated usage in the field. Fourthly, the coupler must be watertight at sea pressures up to 1000 p.s.i.g. and remain so after launch of the vehicle and parting of the fiber optic cable.

Accordingly, there is a need in the development of advanced underwater weapons systems for a small, high pressure, water-tight underwater fiber optic coupler, assembly adapted for use with standard terminators.

SUMMARY OF THE INVENTION

An object of the invention is, therefore, to provide an underwater fiber optic coupler assembly configured and sized to be accommodated by a bulkhead section of a width not exceeding 0.656 inch.

A further object of the invention is to provide such a coupler assembly as is configured to receive on the inboard (dry) and outboard (water) sides thereof standard known inexpensive and readily available terminators, and to provide a coupler adapted to receive a simple, easy to handle, outboard terminator.

Another object is to provide such a coupler assembly having water-tight integrity under outboard pressures of up to 1000 p.s.i.g. and adapted to retain such water-tight integrity after launch of the vehicle in which the coupler assembly is mounted.

With the above and other objects in view, as will hereinafter appear, a feature of the present invention is the provision of a fiber optic coupler assembly for disposition in an underwater bulkhead, the coupler assembly comprising a hydraulic fitting portion of substantially cylindrical configuration and having first threads on an exterior portion thereof. A first shank portion extends axially from the fitting portion and has formed thereon as an integral portion thereof a collar portion configured as a nut. A second shank portion extends axially from the collar portion, and a hub portion extends axially from the second shank portion and has second threads thereon. A tubular portion extends axially from the fitting portion in a direction opposite from the first shank portion. A bore extends through the tubular portion, fitting portion, first shank portion, collar portion, second shank portion, and hub portion and is configured to receive fiber optic terminators. A hydraulic O-ring is mounted on the first shank portion adjacent the collar portion.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings:

FIG. 4 is a side elevational view, partly in section and partly broken away, of the coupler assembly and inboard and outboard terminators, assembled and in place in a vehicle bulkhead.

DESCRIPTION OF THE PREFERRED EMBODIMENT

Figure 1:
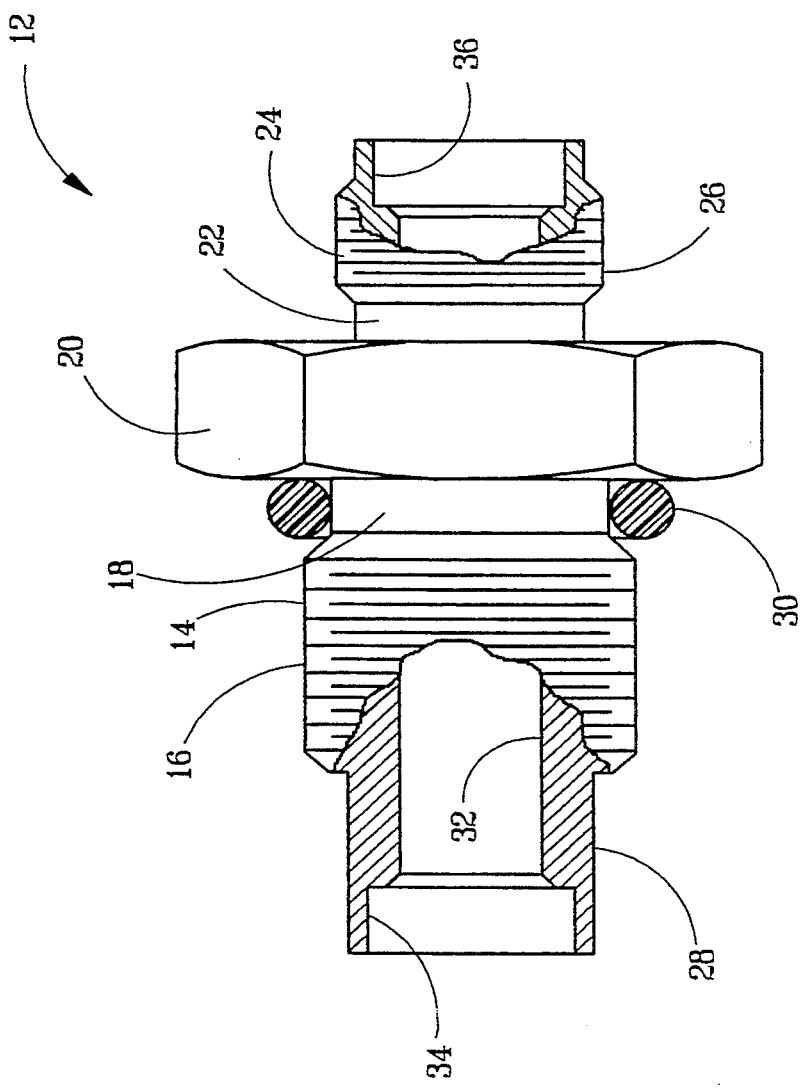
FIG. 1 is a side elevational view, partly broken away, of one form of coupler assembly illustrative of an embodiment of the invention.

Referring to FIG. 1, it will be seen that an illustrative coupler assembly 12 includes a hydraulic fitting portion 14 which is substantially cylindrical in configuration and is provided with first threads 16 externally thereof.

A first shank portion 18 of the coupler assembly 12 extends axially from fitting portion 14 and has formed thereon, as an integral portion thereof, a collar portion 20 configured as a nut, such as a hexagonal nut, preferably having a flat side diameter of 0.5 inch.

A second shank portion 22 of the coupler assembly 12 extends axially from collar portion 20, and a hub portion 24 extends axially from second shank portion 22. The hub portion 24 has thereon second external threads 26.

A tubular portion 28 extends axially from fitting portion 14 in a direction opposite from first shank portion 18.

An O-ring 30 of elastomeric material is mounted on first shank portion 18 adjacent collar portion 20 and between collar portion 20 and fitting portion 14.

Figure 2:
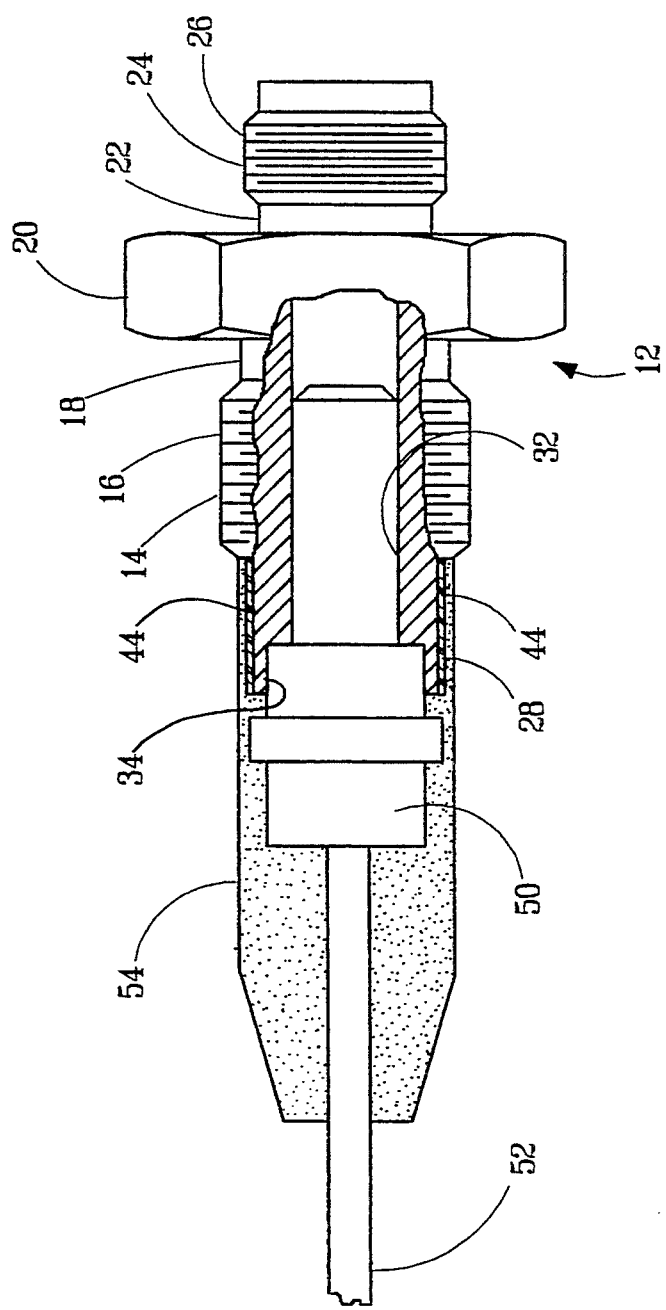
FIG. 2 is similar to FIG. 1, but shows an inboard terminator fixed in the inboard end of the coupler assembly and potted thereto.
Figure 3:
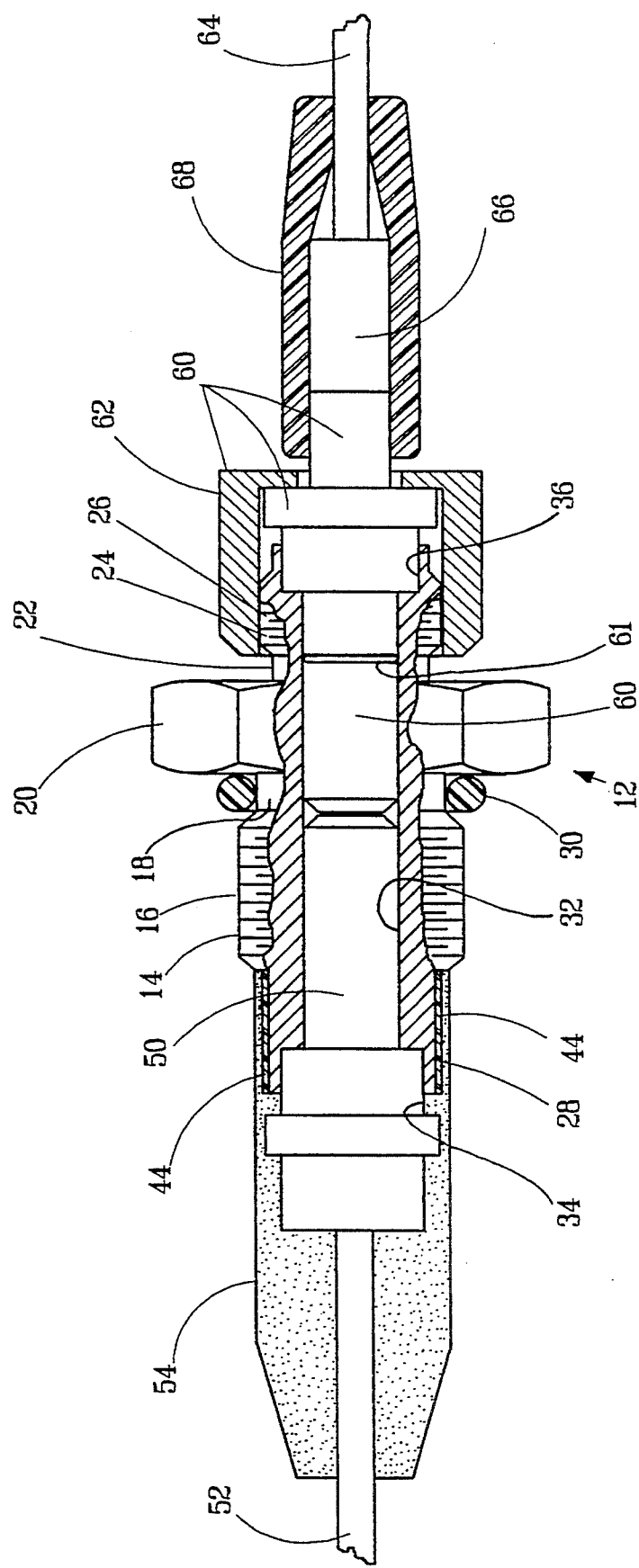
FIG. 3 is similar to FIG. 2, but shows an outboard terminator fixed to the outboard end of the coupler assembly.

Referring to FIGS. 2 and 3, it will be seen that tubular portion 28, fitting portion 14, first shank portion 18, collar portion 20, second shank portion 22, and hub portion 24 have a common bore 32 extending therethrough. Tubular portion 28 and hub portion 24, respectively, define enlarged bore portions 34,36 (FIG.3).

Prior to mounting of coupler assembly 12 in a threaded aperture 40 in a bulkhead 42 (FIG. 4), a known fiber optic cable terminator 50, disposed on an end of fiber optic cable 52 of a selected length is inserted in the inboard end of coupler assembly 12 and into bore 32,34. Tubular portion 28 is provided with a coating 44 of primer for urethane compound. The exposed, coated portion of tubular portion 28, and the terminator 50, and part of cable 52 is then inserted into a mold and a urethane compound molding 54 is formed on fiber optic cable 52, terminator 50 and on tubular portion 28 of coupler assembly 12, to securely bond the inboard end of coupler assembly 12 to inboard terminator 50 and cable 52.

The fiber optic cable 52 is fed through aperture 40 and into the vehicle. The fitting portion 14 is threaded into threaded aperture 40 (FIG. 4) in bulkhead 42 from outboard toward inboard, or from right to left as viewed in FIG. 4, until collar portion 20 abuts bulkhead 42. In screwing in coupler assembly 12, O-ring 30 is compressed between the wall of aperture 40 and first shank portion 18. Collar portion 20 is configured as a hex nut, or the like, such that the threaded movement required of the coupler assembly 12 in aperture 40 may be undertaken by use of an ordinary wrench (not shown) applied by an operator to the collar portion 20.

After coupler assembly 12 is secured in aperture 40, the distal end (not shown) of cable 52 is connected within the vehicle to the vehicle controller (not shown). The coupler assembly is then ready for use and thereafter remains in the mounted position. Until used, a cover (not shown) may be positioned on hub portion 24 to isolate the free end of cable 52, inside terminator 50 and exposed in bore 32.

When it is desired to transmit data to the vehicle controller such as just prior to launch, an outboard terminator 60 (FIGS. 3 and 4), including an internally threaded couple nut 62, is attached to coupler assembly 12 by threaded engagement of couple nut 62 with second threads 26 on hub portion 24 of the coupler assembly. The threaded interconnection of couple nut 62 and hub portion 24 carries the outboard terminator 60 into the bore 32,36, to bring outboard terminator 60, and an end of an outboard fiber optic cable 64, into engagement with inboard terminator 50 and the end of inboard fiber optic cable 52. An O-ring 61 is disposed on the outboard terminator 60 and serves as a seal in the bore 32.

The outboard fiber optic cable 64 is held in the outboard terminator 60 by a metal crimp sleeve 66 which is crimped upon the cable 64 and covered by an elastomeric boot 68.

Upon completion of the attachment of the outboard terminator to coupler assembly 12, data can be transmitted to the vehicle controller. After completion of data transmission, the coupler assembly and terminator remain in place. Upon launch of the vehicle, outboard fiber optic cable 64 breaks away from the crimp sleeve 66 and boot 68 and parts from the outboard terminator. However, the coupler assembly and inboard terminator maintain water-tight integrity in aperture 40.

Thus, there is provided a fiber optic coupler assembly, the largest diameter of which is no more than 0.656 inch, which is adapted to receive known and readily available inboard and outboard terminators, including an outboard terminator having facility for one-step attachment to the coupler assembly, and is water-tight before and after launch.

It is to be understood that the present invention is by no means limited to the particular construction herein disclosed and/or shown in the drawings, but also comprises any modifications or equivalents within the scope of the claims.

What is claimed is:

1. A fiber optic coupler assembly for disposition in an underwater bulkhead, the coupler assembly comprising:
   a hydraulic fitting portion of substantially cylindrical configuration and having first threads on an exterior portion thereof;
   a first shank portion extending axially from said fitting portion and having a collar portion formed thereon as an integral portion thereof;
   a second shank portion integral with and extending from said collar portion in a direction opposite from said first shank portion, said second shank portion being of lesser diameter than said first shank portion;
   a hub portion integral with and extending axially from said second shank portion and having second threads thereon, said hub portion being of larger diameter than said second shank portion;
   a tubular portion extending axially from said fitting portion in a direction opposite from said first shank portion;
   said tubular portion, fitting portion, first shank portion, collar portion, second shank portion, and hub portion having a bore extending therethrough and configured at either end thereof to receive a fiber optic terminator;
   a hydraulic o-ring mounted on said first shank portion, said o-ring having a cross-section diameter substantially equal to the entire length of said first shank portion;
   a coating of primer for urethane compound on said tubular portion; and
   a urethane compound potting positioned about said tubular portion to join said fiber optic terminator to said tubular portion, said primer being provided to adapt said tubular portion to receive and bond to said urethane compound potting.

2. The coupler assembly in accordance with claim 1 wherein said tubular portion and said hub portion define enlarged portions of said bore to receive and retain enlarged portions of said terminators.

3. The coupler assembly in accordance with claim 1 wherein said collar portion extends radially outwardly from said first shank portion and defines a largest widthwise dimension of said coupler assembly.

4. The coupler assembly in accordance with claim 3 wherein said collar portion is configured as a nut having flat sides.

5. The coupler assembly in accordance with claim 4 wherein said configuration is of a hexagonal nut.

6. The coupler assembly in accordance with claim 1 wherein said O-ring is disposed on said first shank portion adjacent said collar portion.

7. The coupler assembly in accordance with claim 6 wherein said O-ring is disposed between said collar portion and said fitting portion.

8. The coupler assembly in accordance with claim 1 wherein said bore is configured to receive said fiber optic terminators such that opposed fiber optic cables of said terminator abut each other.

9. The coupler assembly in accordance with claim 1 wherein said assembly comprises an outboard terminator having an outboard fiber optic cable therein disposed in said bore, and an inboard terminator having an inboard fiber optic cable therein disposed in said bore and opposed to said outboard cable, an end of said outboard fiber optic cable being in direct engagement with an end of said inboard fiber optic cable.

* * * * *